(12) United States Patent
Xia et al.

(10) Patent No.: US 9,148,844 B2
(45) Date of Patent: Sep. 29, 2015

(54) MOBILE INTERNET ACCESS NODE, SYSTEM AND METHOD FOR FINDING PARTNERS

(71) Applicant: NTT DoCoMo, Inc., Tokyo (JP)

(72) Inventors: Xin Xia, Beijing (CN); Yongsheng Zhang, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 162 days.

(21) Appl. No.: 13/721,156

(22) Filed: Dec. 20, 2012

(65) Prior Publication Data

US 2013/0176844 A1 Jul. 11, 2013

(30) Foreign Application Priority Data

Dec. 21, 2011 (CN) .......................... 2011 1 0433326

(51) Int. Cl.
| | |
|---|---|
| G01R 31/08 | (2006.01) |
| G06F 11/00 | (2006.01) |
| H04W 48/16 | (2009.01) |
| H04W 24/04 | (2009.01) |
| H04W 84/04 | (2009.01) |
| H04W 88/10 | (2009.01) |
| H04W 92/20 | (2009.01) |

(52) U.S. Cl.
CPC .............. *H04W 48/16* (2013.01); *H04W 24/04* (2013.01); *H04W 84/047* (2013.01); *H04W 88/10* (2013.01); *H04W 92/20* (2013.01)

(58) Field of Classification Search
CPC ...................................................... H04W 48/16
USPC .......................................................... 370/221
See application file for complete search history.

(56) References Cited

U.S. PATENT DOCUMENTS

| | | | |
|---|---|---|---|
| 8,126,148 B2* | 2/2012 | Chowdhury et al. ......... | 380/277 |
| 2005/0143082 A1* | 6/2005 | Yang ........................... | 455/452.1 |
| 2005/0143083 A1* | 6/2005 | Kwon et al. ................ | 455/452.1 |
| 2005/0215233 A1* | 9/2005 | Perera et al. ................. | 455/411 |
| 2010/0246434 A1* | 9/2010 | Wang et al. .................. | 370/253 |

* cited by examiner

*Primary Examiner* — Mark Rinehart
*Assistant Examiner* — Maharishi Khirodhar
(74) *Attorney, Agent, or Firm* — Harness, Dickey & Pierce, PLC

(57) ABSTRACT

The present invention provides an MiAN, a system and a method for finding partners for use in an MiAN cluster system. The method comprises the step of performing, by the slave MiAN, search on working channels of the proximity interface in accordance with a preset search order, and trying to establish a communication connection with the proximity interface of a master MiAN with respect to the MiANs that have been searched during the search process. When selecting the working channels of the proximity interface, all the master MiANs in the clustering system perform search in accordance with the search order, and operate on the channel which has been searched first in accordance with the search order and the channel quality of which meets a predetermined requirement. According to the present invention, the processes of finding, selecting and binding partners in the MiAN cluster system will be accelerated.

25 Claims, 6 Drawing Sheets

MOBILE INTERNET ACCESS NODE, SYSTEM AND METHOD FOR FINDING PARTNERS

CROSS-REFERENCE TO RELATED APPLICATIONS

This application claims the benefit and priority of CN 201110433326.X, filed Dec. 21, 2011. The entire disclosure of the above application is incorporated herein by reference.

FIELD OF THE INVENTION

The present invention relates to the field of mobile telecommunication technology, in particular to a method, an apparatus and a system for quickly finding self-organized partners in a Mobile Internet Access Node cluster system.

DESCRIPTION OF THE PRIOR ART

Mobile Internet Access Node (MiAN) is a device provided with both wireless WAN and wireless LAN access capabilities. Its wireless WAN interface may be any standardized cellular network system, such as WCDMA, CDMA, WiMAX, LTE, and LTE-A, and its wireless LAN interface may be implemented on the basis of 802.11 WiFi. Apart from the above two necessary interfaces, MiAN may also be provided with a proximity interface for intercommunication between the access nodes. Such an interface may be implemented via various communication technologies, for example, via a short-distance communication technology such as Bluetooth or Zigbee, or via 802.11 WiFi, or via a wired connection such as Ethernet or RJ45. The proximity interface may be a separate physical entity interface (see FIG. 1), or a logical, physical entity interface shared with a wireless LAN (see FIG. 2).

Wireless Internet Device (WiD) is a device having a wireless LAN interface and supporting various Internet applications, such as a smart phone, a digital camera and a game console.

FIG. 3 is a schematic view showing an MiAN cluster system (hereinafter referred to as cluster system). The cluster system is a cluster of MiANs (merely a master MiAN and a slave MiAN are shown in FIG. 3). The WAN output links of the access nodes flexibly cluster together to effect bandwidth sharing therebetween, and thereby to solve the bottleneck problem in the system bandwidth of the WAN output links. For the specific clustering ways and structures, reference may be made to the Chinese patent application "Mobile Internet Access Node, and Method and System for Clustering Bandwidth" with the application No. 2011101450007.

It is a significant function for the MiAN cluster system to find the potential partners capable of forming a cluster system in a quick, effective and accurate manner. If a method based on the traditional technology is adopted for finding the partners, such a method generally includes three stages, i.e., setting up physical channel pairing and link layer connection, setting up the binding, and sharing the bandwidth/service. As a result, it will take more time and power.

SUMMARY OF THE INVENTION

The technical problem to be solved by the present invention is to provide a method, an apparatus and a system for quickly finding self-organized partners in an MiAN cluster system, so as to achieve the process of finding, selecting and binding the partners in the MiAN cluster system.

In order to solve the above-mentioned technical problem, the present invention provides a method for finding partners in an MiAN cluster system, wherein the MiAN cluster system comprising a server, one or more master MiANs and one or more slave MiANs, each of the MiANs including a proximity interface for establishing a communication connection with the other MiANs. The method comprises the steps of:

performing, by the slave MiAN, search on working channels of the proximity interface in accordance with a preset search order, and trying to establish a communication connection with the proximity interface of a master MiAN with respect to the MiANs that have been searched during the search process;

wherein, when selecting the working channels of the proximity interface, all the master MiANs in the clustering system perform search in accordance with the search order, and operate on the channel which has been searched first in accordance with the search order and the channel quality of which meets a predetermined requirement.

Preferably, the step of performing, by the slave MiAN, search on working channels of the proximity interface in accordance with the preset search order, and trying to establish the communication connection with the proximity interface of the master MiAN with respect to the MiANs that have been searched during the search process comprises:

acquiring a search priority preset for each channel of the proximity interface, different channels having different search priorities;

performing search on all the channels of the proximity interface one by one in a descending order of the search priorities;

trying to establish a communication connection with the proximity interfaces of the MiANs one by one when the MiANs have been searched on a current channel, and terminating the process when the communication connection with any of the MiANs has been established successfully, otherwise continuing to perform search on a next channel; and continuing to perform search on the next channel if no MiAN has been searched on the current channel.

Preferably, the step of performing, by the slave MiAN, search on working channels of the proximity interface in accordance with the preset search order, and trying to establish the communication connection with the proximity interface of the master MiAN with respect to the MiANs that have been searched during the search process comprises:

acquiring at least two channel groups divided in advance for all the working channels of the proximity interface, a search priority of each channel group, and channel information included in each channel group, wherein each channel group including more than one channels and different channel groups having different search priorities;

performing search on each channel group of the at least two channel groups in a descending order of the search priorities;

trying to establish a communication connection with the proximity interfaces of the MiANs one by one when the MiANs have been searched on a current channel group, and terminating the process when the communication connection with any of the MiANs has been established successfully, otherwise continuing to perform search on a next channel group; and continuing to perform search on the next channel group if no MiAN has been searched on the current channel group.

Preferably, in the method, all the MiANs further carry working state information in a link layer management frame transmitted through the proximity interfaces. The working state information includes indication information indicating whether the MiAN supports a clustering function.

When performing the search, the slave MiAN further filters the MiAN that does not support a clustering function in accordance with the indication information carried in the link layer management frame and transmitted from the other MiANs.

Preferably, the working state information further includes at least one of the parameters selected from the group consisting of information indicating whether the MiAN is a private device, a bandwidth of a WAN interface of the MiAN, a current throughput of the WAN interface, a type of the network accessed through the WAN interface, the number of work stations that have accessed the MiAN, information indicating whether the work stations that have accessed the MiAN are full, and power information.

The step of trying to establish the communication connection with the proximity interfaces of the MiANs that have been search one by one comprises:

sorting, by the slave MiAN, the MiANs that have been searched in accordance with the at least one parameter; and trying to establish a communication connection with the MiANs that have been searched one by one in accordance with the order after sorting, until the communication connection has been successfully established or an attempt to establish the communication connection with all the MiANs is failed.

Preferably, when there are two or more parameters, the step of sorting the MiANs that have been searched comprises:

determining a priority of each of the two or more parameters; and judging superiority of the same parameter of the MiANs that have been searched sequentially in a descending order of the priorities of the parameters, so as to determine an order of the MiANs, and when a first parameter of a first MiAN is better than a first parameter of a second MiAN, determining that the order of the first MiAN is prior to the order of the second MiAN.

Preferably, the step of trying to establish the communication connection with the proximity interface of the master MiAN comprises:

trying, by the slave MiAN, to establish a link layer pairing with the master MiAN through link layer authentication and association; and trying, by the slave MiAN, to establish a binding relationship with the master MiAN on an IP layer after the pairing is established successfully.

Preferably, the step of trying, by the slave MiAN, to establish the binding relationship with the master MiAN on the IP layer comprises:

transmitting, by the slave MiAN, a binding request to the master MiAN on a corresponding channel, a destination IP address of the binding request being an IP address of the master MiAN;

judging, by the slave MiAN, that the establishment of the communication connection is failed when a binding rejection is received from the master MiAN or information is not received from the master MiAN due to a timeout on the corresponding channel; and establishing and storing locally, by the slave MiAN, the binding relationship with the master MiAN upon receiving a binding response with respect to the binding request from the master MiAN on the corresponding channel, and sending a binding confirmation to the master MiAN so that the master MiAN confirms that the binding is successfully established.

Preferably, the binding request carries a first parameter including a bandwidth of the slave MiAN, a queue length of the data to be transmitted, a load and an power information, so that the master MiAN mobilizes the slave MiAN based on the first parameter.

The binding rejection carries reasons for rejection so as to indicate to the slave MiAN the reasons for which the binding is failed.

The binding response carries a second parameter including a bandwidth of the master MiAN, a queue length of the data to be transmitted, a load and power information so that the slave MiAN acquires the working state of the master MiAN.

Preferably, after the binding relationship between the slave MiAN and the master MiAN is established, the method further comprises:

transmitting, by the master MiAN, a connection indication to the slave MiAN; and returning, by the slave MiAN, a connection confirmation to the master MiAN upon receiving the connection indication, so that the master MiAN maintains the binding relationship with the slave MiAN.

Preferably, when it is desired to unbind the slave MiAN and the master MiAN, the method further comprises:

transmitting, by one of the slave MiAN and the master MiAN, an unbinding request to the other one, the unbinding request carrying the reasons for unbinding;

transmitting an unbinding response to the one of the slave MiAN and the master MiAN after the binding relationship is canceled locally by the other one; and locally cancelling, by the one of the slave MiAN and the master MiAN, the binding relationship upon receiving the unbinding response.

The present invention further provides a slave MiAN in an MiAN cluster system, comprising:

a searching unit configured to perform search on working channels of a proximity interface in accordance with a preset search order; and a pairing binding unit configured to establish a communication connection with a proximity interface of a master MiAN with respect to the MiANs that have been searched by the searching unit.

When selecting the working channels of the proximity interface, all the master MiANs in the cluster system perform search in accordance with the search order, and operate on the channel which has been searched first in accordance with the search order and the channel quality of which meets a predetermined requirement.

Preferably, the slave MiAN further comprises:

a first acquiring unit configured to acquire a search priority preset for each channel of the proximity interface, different channels having different search priorities.

The searching unit is specifically used for performing search on all the working channels of the proximity interface sequentially in a descending order of the search priorities.

The pairing binding unit comprises:

a first processing unit configured to establish a communication connection with the proximity interfaces of the MiANs one by one when the MiANs have been searched by the searching unit on a current channel;

a first controlling unit configured to control the searching unit to stop searching when the communication connection is successfully established between the first processing unit and any of the MiANs, and to control the searching unit to perform search on a next channel when the establishment of the communication connection between the first processing unit and any of the MiANs is failed; and a second processing unit configured to control the searching unit to perform search on the next channel when no MiAN has been searched by the searching unit on the current channel.

Preferably, the slave MiAN further comprises:

a second acquiring unit configured to acquire at least two channel groups divided in advance for all working channels of the proximity interface, a search priority of each channel group and channel information included in each channel group, wherein each channel group including more than one channels, and different channel groups having different search priorities.

The searching unit is specifically configured to perform search on each of the at least two channel groups in a descending order of the search priorities.

The pairing binding unit comprises:

a first processing unit configured to establish a communication connection with the proximity interfaces of the MiANs one by one when the MiANs have been searched by the searching unit on a current channel group;

a first control unit configured to control the searching unit to stop searching when the communication connection is successfully established between the first processing unit and any of the MiANs, and to control the searching unit to perform search on a next channel group when the establishment of the communication connection between the first processing unit and any of the MiANs is failed; and a second processing unit configured to control the searching unit to perform search on the next channel group when no MiAN has been searched by the searching unit on the current channel group.

Preferably, in the slave MiAN, the searching unit, when performing the search, is further configured to filter the MiANs that do not support a clustering function in accordance with indication information in a link layer management frame from the other MiANs for indicating whether the MiANs support a clustering function, wherein the indication information is carried in working state information included in the link layer management frame when all the MiANs in the cluster system transmit the link layer management frame through the proximity interfaces.

Preferably, in the slave MiAN, the working state information further includes at least one of the parameters selected from the group consisting of information indicating whether the MiAN is a private device, a bandwidth of a WAN interface of the MiAN, a current throughput of the WAN interface, a type of network accessed through the WAN interface, the number of work stations that have accessed the MiAN, information indicating whether the work stations that have accessed the MiAN are full, and power information.

The first processing unit comprises:

a sorting unit configured to sort the MiANs that have been searched in accordance with the at least one parameter; and a connection trying unit configured to try to establish a communication connection with the proximity interfaces of the MiANs that have been searched one by one in accordance with the order after sorting, until the communication connection is established successfully or an attempt to establish the communication connection with all the MiANs is failed.

Preferably, in the slave MiAN, when there are two or more parameters, the sorting unit comprises:

a first determining unit configured to determine a priority of each of the two or more parameters; and a second determining unit configured to judge superiority of the same parameter of the MiANs that have been searched sequentially in a descending order of the priorities of the parameters, so as to determine an order of the MiAN, and when it is judged that a first parameter of a first MiAN is better than a first parameter of a second MiAN, determine that the first MiAN is prior to the second MiAN.

Preferably, in the slave MiAN, the pairing binding unit comprises:

a pairing unit configured to try to establish a pairing on a link layer with the master MiAN through link layer authentication and association; and a binding unit configured to try to establish a binding relationship on an IP layer with the master MiAN after the pairing is established successfully.

Preferably, in the slave MiAN, the binding unit comprises:

a requesting unit configured to transmit a binding request to the master MiAN on a corresponding channel, a destination IP address of the binding request being an IP address of the master MiAN;

a failure processing unit configured to judge that the establishment of the communication connection is failed when a binding rejection is received from the master MiAN or information is not received from the master MiAN due to a timeout on the corresponding channel; and a success processing unit configured to establish and store locally the binding relationship with the master MiAN upon receiving a binding response with respect to the binding request from the master MiAN on the corresponding channel, and transmit a binding confirmation to the master MiAN so that the master MiAN confirms that the binding is successfully established.

Preferably, the slave MiAN further comprises:

a connection maintaining unit configured to receive a connection indication from a master MiAN after the binding relationship is established between the slave MiAN and the master MiAN, and return a connection confirmation to the master MiAN so that the master MiAN maintains the binding relationship therebetween.

Preferably, the slave MiAN further comprises:

an unbinding requesting unit configured to transmit an unbinding request to the master MiAN when it needs to unbind the slave MiAN and the master MiAN, the unbinding request carrying the reasons for unbinding; and an unbinding responding unit configured to locally cancel the binding relationship upon receiving an unbinding response returned from the master MiAN, locally cancel the binding relationship upon receiving the unbinding request from the master MiAN, and return the unbinding response to the master MiAN.

The present invention further provides a master MiAN in an MiAN cluster system, comprising:

a searching unit configured to perform search on working channels of a proximity interface in accordance with a preset search order; and a configuring unit configured to configure the proximity interface of the master MiAN to operate on the channel which has been searched first in accordance with the search order and the channel quality of which meets a predetermined requirement.

Preferably, the master MiAN further comprises:

a first acquiring unit configured to acquire a search priority preset for each channel of the proximity interface, different channels having different search priorities.

The searching unit is specifically configured to perform search on all the working channels of the proximity interface one by one in a descending order of the search priorities.

The configuring unit is specifically configured to acquire a search result from the searching unit on a current channel, configure the proximity interface of the master MiAN to operate on the channel when there exists in the search result a channel whose channel quality meets the predetermined requirement, and control the searching unit to stop searching.

Preferably, the master MiAN further comprises:

a second acquiring unit configured to acquire at least two channel groups divided in advance for all the working channels of the proximity interface, a search priority of each channel group, and channel information included in each channel group, wherein each channel group including more than one channels and different channel groups having different search priorities.

The searching unit is specifically configured to perform search on each of the at least two channel groups in a descending order of the search priorities.

The configuring unit is specially configured to acquire a search result from the searching unit on a current channel group, configure the proximity interface of the master MiAN to operate on the channel when there exists in the search result a channel whose channel quality meets the predetermined requirement, and control the searching unit to stop searching.

Preferably, the master MiAN further comprises:

a transmission processing unit configured to carry working state information of the master MiAN in a link layer management frame from the master MiAN, the working state information including indication information indicating whether the master MiAN supports a clustering function, so as to filter by a slave MiAN in advance the master MiAN that does not support a clustering function in accordance with the indication information when the slave MiAN searches the master MiAN and tries to establish a communication connection with the proximity interface of the master MiAN.

Preferably, in the master MiAN, the working state information further includes at least one of the parameters selected from the group consisting of information indicating whether the MiAN is a private device, a bandwidth of a WAN interface of the MiAN, a current throughput of the WAN interface, a type of the network accessed through the WAN interface, the number of work stations that have accessed the MiAN, information indicating whether the work stations that have accessed the MiAN are full, and power information, so that the slave MiAN sorts the master MiANs that have been searched in accordance with the at least one parameter when the slave MiAN searches the master MiAN and tries to establish a communication connection with the proximity interface of the master MiAN.

Preferably, the master MiAN further comprises:

a pairing unit configured to establish a pairing on a link layer with the slave MiAN through link layer authentication and association; and a binding unit configured to establish a binding relationship on an IP layer with the slave MiAN after the pairing is established successfully.

Preferably, in the master MiAN, the binding unit comprises:

a first processing unit configured to transmit a binding rejection or a binding response to the slave MiAN on a corresponding channel upon receiving a banding request from the slave MiAN on the corresponding channel; and a second processing unit configured to locally establish and store the binding relationship with the slave MiAN upon receiving a binding confirmation from the slave MiAN on the corresponding channel.

Preferably, the master MiAN further comprises:

a connection maintaining unit configured to transmit a connection indication to the slave MiAN after the binding relationship is established between the master MiAN and the slave MiAN, and maintain the binding relationship therebetween after receiving a connection confirmation from the slave MiAN.

Preferably, the master MiAN further comprises:

an unbinding requesting unit configured to transmit an unbinding request to the slave MiAN when it needs to unbind the slave MiAN and the master MiAN, the unbinding request carrying the reasons for unbinding; and an unbinding responding unit configured to locally cancel the binding relationship upon receiving an unbinding response from the slave MiAN, locally cancel the binding relationship upon receiving the unbinding request from the slave MiAN, and return the unbinding response to the slave MiAN.

The present invention further provides an MiAN cluster system comprising one or more master MiANs and one or more slave MiANs. Each MiAN includes a proximity interface for establishing a communication connection with the other MiANs.

The master MiAN is configured to perform search on working channels of the proximity interface in accordance with a preset search order, and configure the proximity interface to operate on a channel which has been searched first in accordance with the search order and the channel quality of which meets a predetermined requirement.

The slave MiAN is configured to perform search on working channels of the proximity interface in accordance with the preset search order, and try to establish communication connection with the proximity interface of the master MiAN when the master MiAN has been searched.

As can be seen from the above, according to the method, apparatus and system for quickly finding self-organized partners in an MiAN Cluster system, the master MiAN in the cluster system performs search in accordance with the same preset search order when selecting the working channels of the proximity interface, and operates on the channel which has been searched first in accordance with the search order and the channel quality of which meets a predetermined requirement. As a result, the master MiAN will most likely operate on the channel at the top of the search order. When the slave MiAN performs search in accordance with the same search order, the master MiANs will be found more easily, and the master MiAN to be paired may be found without performing complete search. Hence, the time and power consumption for the search on the channels without a master MiAN in the prior art will be reduced or avoided, and the process of finding partners and the subsequent processes of pairing and binding will be accelerated. Particularly, when there exists a lower access point (AP) density, the time delay for search and pairing may be reduced remarkably. Moreover, the master MiAN according to the present invention may transmit the working state information in a link layer management frame in a layer-across manner, so as to remove some unsuitable MiANs or common access points before the link layer connection and the IP-layer binding are established, thereby to further reduce the unnecessary time delay and energy consumption. According to the present invention, more suitable MIANs will be selected during the process of pairing based on the working state information, so as to establish the pairing and binding preferentially. Finally, the present invention is easily implemented, and meanwhile it is unnecessary to change the current standard or the hardware architecture of the equipment.

DETAILED DESCRIPTION OF THE PREFERRED EMBODIMENTS

The present invention will be described hereinafter in conjunction with the drawings and the embodiments so as to make the objects, the technical solutions and the advantages of the present invention more apparent.

In a current MiAN Cluster System, it is necessary to perform search and communication on the channels one by one so as to establish a link layer connection between the MiANs, and many channels may not include corresponding MiANs, or access nodes that are willing to join the Cluster System. In addition, the processes of finding and binding the link layers in the conventional method are isolated and sometimes repeated, and as a result such processes will be delayed for a long period of time and unnecessary power consumption will occur. Usually, these are intolerable for the mobile equipment such as MiAN.

Embodiments of the present invention provides a method for quickly finding self-organized partners in an MiAN cluster system including one or more master MiANs and one or more slave MiANs. Each MiAN includes a proximity interface for establishing a communication connection with the other MiANs and can operate at either a master mode or a slave mode which can be designated through manual configuration. The MiAN operating at the slave mode can establish a communication connection with a master MiAN through the proximity interface, and a master MiAN can establish a communication connection with a plurality of slave MiANs through the proximity interfaces, thereby to achieve the functions such as bandwidth clustering and service sharing.

Figure 1:
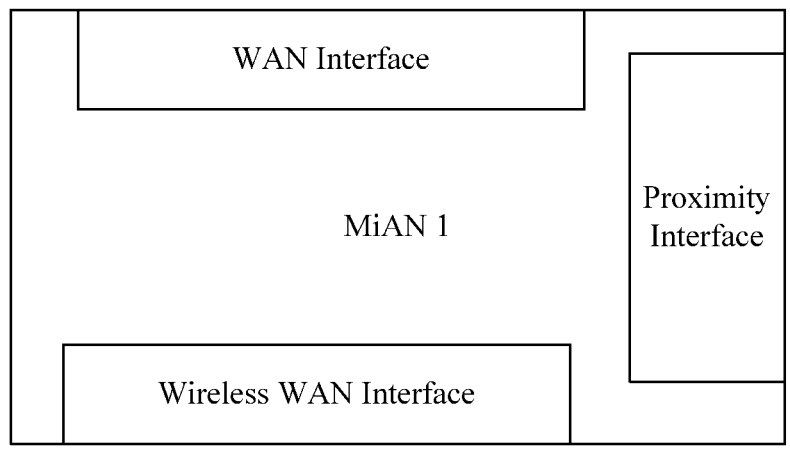
FIG. 1 is a structural schematic view showing a proximity interface of an MiAN.
Figure 2:
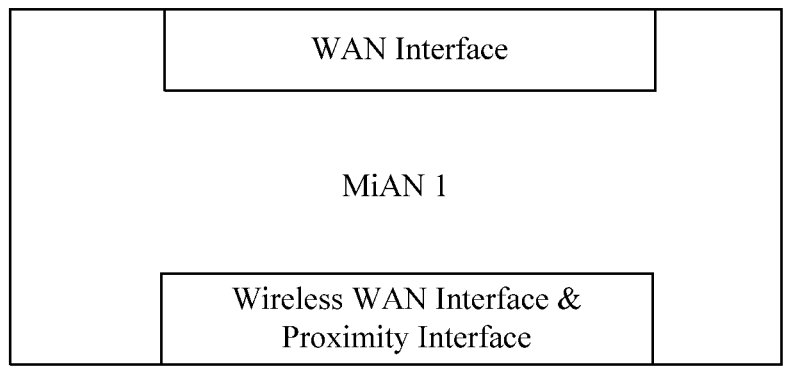
FIG. 2 is another structural schematic view showing the proximity interface of the MiAN.
Figure 3:
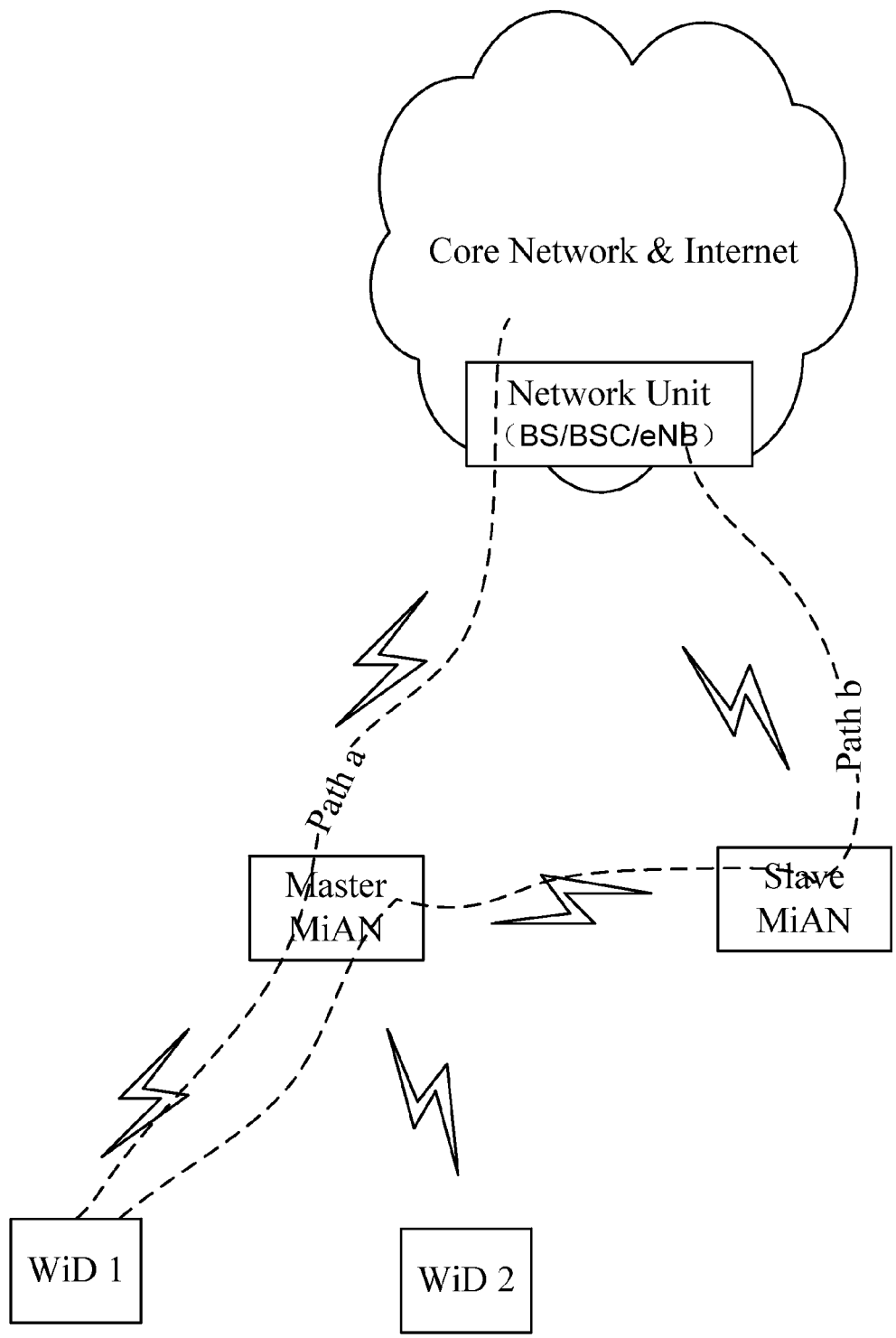
FIG. 3 is a structural schematic view showing an MiAN cluster system.
Figure 4:
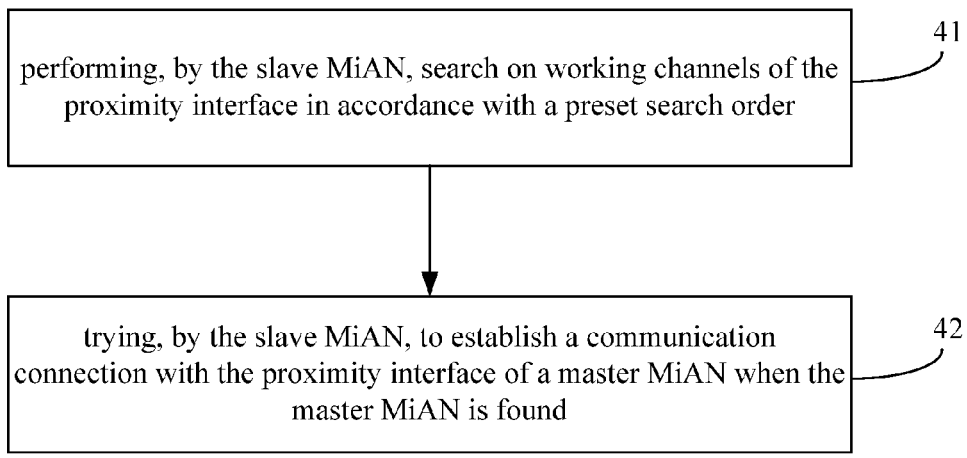
FIG. 4 is a flow chart of a method for finding partners according to embodiments of the present invention.

Referring to FIG. 4, the method according to embodiments of the present invention comprises the following steps:

Step 41: performing, by the slave MiAN, search on working channels of the proximity interface in accordance with a preset search order; and Step 42: trying, by the slave MiAN, to establish a communication connection with the proximity interface of a master MiAN when the master MiAN is found.

In the embodiment, all the master MiANs in the cluster system perform search in accordance with the search order when selecting the working channels of the proximity interfaces, and operate on the channel which has been searched first in accordance with the search order and the channel quality of which meets a predetermined requirement. As a result, the master MiANs will most likely operate on the channel at the top of the search order. When the slave MiAN performs search in accordance with the same search order, the master MiAN will be found more easily, and the master MiAN to be paired may be found without performing complete search. Hence, the time and power consumption for the search on the channels without a master MiAN in the prior art will be reduced or avoided, and the process of finding partners and the subsequent processes of pairing and binding will be accelerated According to embodiments of the present invention, the search order may be preset in all the master MiANs and slave MiANs, or may be acquired from a predetermined server in the network after the master MiANs and the slave MiANs are turned on.

Figure 5:
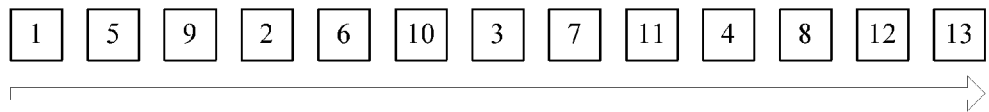
FIG. 5 is a view showing an example for setting search priorities of channels according to embodiments of the present invention.

The search order may be set separately for each working channel of the proximity interface, i.e., a search priority is set in advance for each channel of the proximity interface, and different channels have different search priorities. FIG. 5 shows the search priorities of channels 1-13, where the channels are sorted in a descending order of the search priorities as follows: channel 1, channel 5, channel 9, channel 2, channel 6, channel 10, channel 3, channel 7, channel 11, channel 4, channel 8, channel 12 and channel 13. In steps 41 and 42, the slave MiAN acquires the search priority preset for each channel of the proximity interface, and different channels have different search priorities. Then, the slave MiAN performs search on all the working channels of the proximity interface one by one in the descending order of the search priorities (e.g., the search order as shown in FIG. 5).

(1) If the MiANs (probably more than two MiANs) are found on a current channel, the slave MiAN tries to establish a communication connection with the proximity interfaces of the MiANs one by one. If the communication connection with any of the MiANs is established successfully, the process is terminated, and if an attempt to establish the communication connection with all the MiANs is failed, the slave MiAN continues to perform search on a next channel.

(2) If no MiAN is found in the current channel, the slave MiAN continues to perform search on the next channel.

In the above (1), if more than two MiANs are found on the current channel, the slave MiAN further tries to establish the communication connection with the MiANs one by one in accordance with superiority order of the signal quality of the MiANs.

Figure 6:
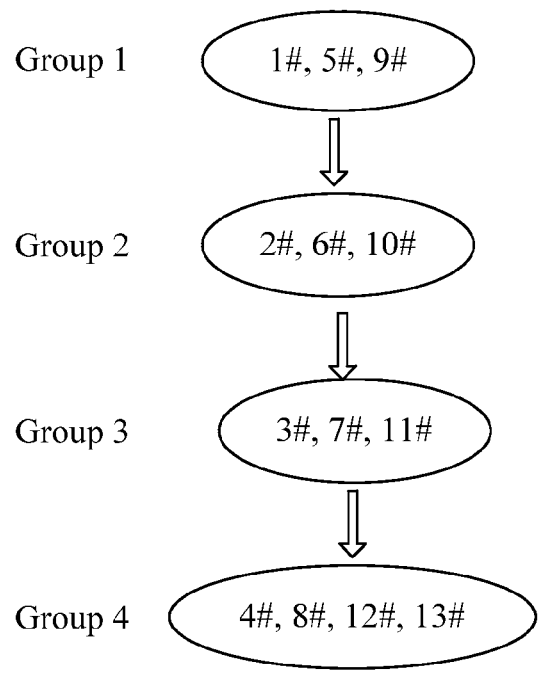
FIG. 6 is a view showing an example for setting search priorities of channel groups according to embodiments of the present invention.
Figure 7:
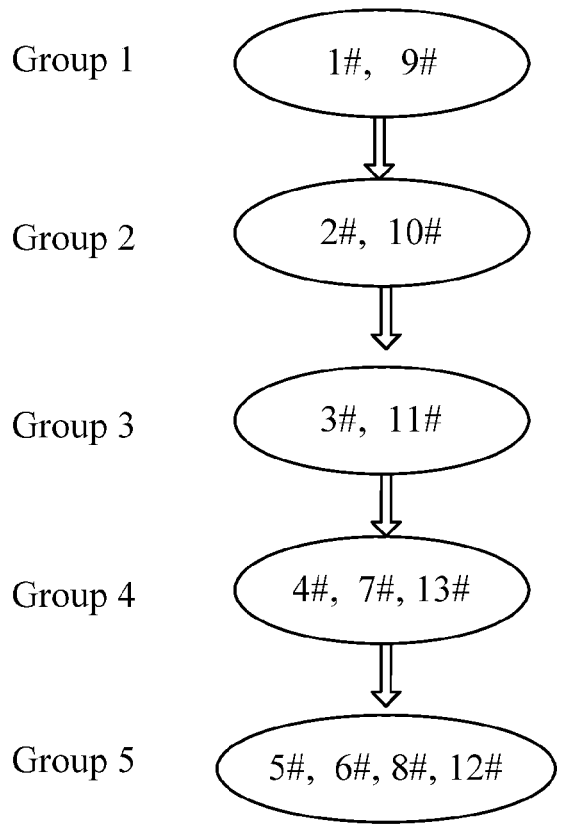
FIG. 7 is a view showing another example for setting search priorities of channel groups according to embodiments of the present invention.

The search order may be set separately for the channel groups of the proximity interface, i.e., all the working channels of the proximity interface are divided in advance into at least two channel groups, and each channel group includes more than one channel. Different channel groups are provided in advance with different search priorities, and the channels in the same channel group have an identical search priority. At least one of the channel groups has more than two channels. The search order of the channels in the same channel group is not limited in the present invention, and the search may be performed randomly or in a descending or ascending order of the channel numbers. In embodiments of the present invention, any channel group may include channels of the same or different number, as shown in FIGS. 6 and 7. In FIG. 6, channel groups 1, 2 and 3 include three channels respectively, and channel group 4 includes four channels, i.e., channel group 1: channel 1, channel 5 and channel 9;
channel group 2: channel 2, channel 6, and channel 10;
channel group 3: channel 3, channel 7, and channel 11; and
channel group 4: channel 4, channel 8, channel 12 and channel 13.

The search priorities of the channel groups, in a descending order, are as follows: channel group 1, channel group 2, channel group 3 and channel group 4.

In FIG. 7, channel groups 1, 2 and 3 include two channels respectively, channel group 4 includes three channels, and channel group 5 includes four channels, i.e.,
channel group 1: channel 1 and channel 9;
channel group 2: channel 2 and channel 10;
channel group 3: channel 3 and channel 11;
channel group 4: channel 4, channel 7 and channel 13;
channel group 5: channel 5, channel 6, channel 8 and channel 12.

The search priorities of the channel groups, in a descending order, are as follows: channel group 1, channel group 2, channel group 3, channel group 4 and channel group 5.

At this time, in steps 41 and 42, the slave MiAN acquires at least two channel groups divided in advance for all the working channels of the proximity interface, a search priority of each channel group and channel information included in each channel group, and then performs search on each of the at least two channel groups in a descending order of the search priorities.

(1) If the MiANs (probably more than two MiANs) are found in a current channel group, the slave MiAN tries to establish a communication connection with the proximity interfaces of the MiANs one by one. If the communication connection with any of the MiANs is established successfully, the process is terminated, and if an attempt to establish the communication connection with all the MiANs is failed, the slave MiAN continues to perform search on a next channel group.

Here, when a plurality of MiANs have been found on a channel of a channel group, the plurality of MiANs may be further sorted, and the communication connection with the MiANs one by one is established in accordance with the order after sorting. The sorting is performed on the basis of the information such as the operation parameters of the MiAN read from a link layer management frame, and the specific mode for sorting will be described later.

(2) If no MiAN has been found in the current channel group, the slave MiAN continues to perform search on the next channel group.

In a preferred embodiment, the number of the channels included in the channel group with a higher search priority is smaller or equal to the number of the channels included in the channel group with a lower search priority. In other words, the channel group at the top of the search order includes fewer channels. As a result, when there is a small number of master MiANs and the density thereof is low, the proximity interfaces of the master MiANs usually operate on the channel in the channel groups at the top of the search order. Since the channel group at the top of the search order includes fewer channels, the slave MiAN can quickly complete the search on all the channels in the channel group, and thereby can quickly find a suitable master MiAN to be paired and bound.

The link layer pairing may be further optimized in embodiments of the present invention. For example, the MiANs in the cluster system may carry working state information in a link layer management frame transmitted through the proximity interface. The working state information includes indication information indicating whether the MiANs support a clustering function. When performing the search, the slave MiAN further filters the MiANs that do not support a clustering function in accordance with the indication information in the link layer management frame received from the other MiANs. Here, the term "supporting a clustering function" means that the MiAN, as a master MiAN, supports the establishment of a communication connection with the proximity interface of the slave MiAN. A user may configure manually the MiAN to operate at a master mode and enable a clustering function of the proximity interface so that the master MiAN supports a clustering function.

The working state information in the embodiment may further be selected from at least one parameter selected from the group consisting of information indicating whether the MiAN is a private device, a bandwidth of a WAN interface of the MiAN, a current throughput of the WAN interface, a type of the network accessed through the WAN interface, the number of work stations that have accessed the MiAN, information indicating whether the work stations that have accessed the MiAN are full, power information and wireless channel utilization rate. Taking a WiFi system as an example, the master MiAN may provide in the link layer management frame information such as a type of an MiAN, indication information indicating whether the MiAN supports a clustering function (pairing capability) and operational parameters. As a result, some unsuitable MiANs or common access points will be removed before the connection on the link layer and the binding on an IP layer are established, and the unnecessary time delay and power consumption will be further reduced.

(1) A one-bit indication information may be carried in an Information Element (IE) of Capability Information of a Beacon Frame, so as to differentiate the MiAN from the common or other access points. For example, as shown in the following table, the indication information may be carried in a one-bit Reserved field of the Information Element of the Capability Information.

| ESS | IBSS | CF Pollable | CF-Poll Request | Privacy | Short Preamble | PBCC | Channel Agility | Spectrum Mgmt | QoS | Short Slot Time | APSD | Reserved | DSSS-OFDM | Delayed Block Ack | Immediate Block Ack |
| --- | --- | --- | --- | --- | --- | --- | --- | --- | --- | --- | --- | --- | --- | --- | --- |

(2) An equipment manufacturer IE is added into a Beacon Frame and a Probe Response Frame, including operation status information of the MiANs, e.g., information indicating whether the MiAN is a private device, information indicating whether an access terminal is fully loaded, the number of the access terminals, a type of the network at a WAN side, an average throughput at the WAN side, a battery life, and wireless channel utilization rate (the higher the utilization rate, the busier the channel or the more the number of users). A possible equipment manufacturer IE has the structure as shown in the following table:

| P | F | N | NW | BW | T | C | R |
| --- | --- | --- | --- | --- | --- | --- | --- | wherein, the meanings and the lengths of the fields are shown in the following table:

| Field | Meaning | Length (bit) |
| --- | --- | --- |
| P | whether the MiAN is a private device | 1 |
| F | whether the number of the terminals accessed to the equipment reaches a predetermined value | 1 |

-continued

| Field | Meaning | Length (bit) |
|---|---|---|
| N | the number of the terminals accessed to the equipment | 4 |
| NW | a type of the network accessed through the interface at a WAN side | 4 |
| BW | a current average throughput of the interface at a WAN side | 8 |
| T | the remaining working hours of a battery | 8 |
| C | wireless channel utilization rate | 8 |
| R | reserved bits | 6 |

When a communication connection with the proximity interfaces of the MiANs that have been searched one by one is established, step 42 may comprise the following steps:

Step 421: sorting, by the slave MiAN, the MiANs that have been searched in accordance with the at least one parameter; and Step 422: trying to establish a communication connection with the proximity interfaces of the MiANs that have been found one by one in accordance with the order after sorting, until the communication connection with any of the MiANs is established successfully or an attempt to establish the communication connection with all the MiANs is failed.

Furthermore, when there are two or more parameters, step 421 comprises the following steps:

Step 4211: determining a priority of each of the two or more parameters; and

Step 4212: judging superiority of the same parameter of the MiANs that have been found sequentially in a descending order of the search priorities, so as to determine an order of the MiANs, when it is judged that a first parameter of a first MiAN is better than a first parameter of a second MiAN, determining that the order of the first MiAN is prior to that of the second MiAN, and when the first parameter of the first MiAN is equal to the first parameter of the second MiAN, continuing to judge a second parameter of a first master MiAN and a second master MiAN, wherein the second parameter is a parameter following the first parameter in a descending order of the parameter priorities.

In accordance with the above principle, the order of the MiANs that have been searched depends on the parameter with the highest priority. When the parameter with the highest priority of one master MiAN is better than the parameter with highest priority of another master MiAN, the order of the one master MiAN is prior to that of the other. When the parameters with the highest priority are the same, the parameters with second highest priority will be taken into consideration until the parameters with the lowest priority have been taken into consideration.

For example, when the two or more parameters include a type of the network accessed through a WAN interface and a bandwidth of the WAN interface, presumed that the MiANs of the first kind include five MiANs, i.e., MiAN1-5, the working channels of the respective proximity interface and the parameters are shown in the following table.

| BSSID | Type of Network | Bandwidth (bit) |
|---|---|---|
| MIAN1 | CDMA | 2M |
| MIAN2 | WCDMA | 4M |
| MIAN3 | WCDMA | 5M |
| MIAN4 | TD-SCDMA | 6M |
| MIAN5 | CDMA2000 | 5M |

Presumed that the bandwidth has a priority higher than the type of the network, it can be seen that MiAN3 and MiAN4 have the same bandwidth, and the type of the access network is further taken into consideration. Presumed that WCDMA is set to be superior to TD-SCDMA, TD-SCDMA is set to be superior to CDMA200, and CDMA2000 is set to be superior to CDMA, MiAN4 may be set as the first in the order. Similarly, it can be determined that the second to the fifth MiANs in the order are MiAN3, MiAN5, MiAN 2 and MiAN1.

In the embodiment, when the parameter has a continuous value range, the value range may be divided into several (e.g., more than two) numerical ranges not overlapped with each other, and the different values within the same numerical range may be considered as equal. When a first parameter has a continuous value range, it is judged that the first parameter of a first master MiAN is better than the first parameter of a second MiAN by judging a first numerical range of the first parameter of the first master MiAN is better than a second numerical range of the first parameter of the second master MiAN. If the first numerical range is equal to the second numerical range, it is judged that the first parameter of the first master MiAN is equal to the first parameter of the second master MiAN. To be specific, the numerical ranges may be determined according to the influence of the values in the numerical ranges on the parameter.

Therefore, when the first parameter has a continuous value range and the value range is divided in advance into more than two numerical ranges not overlapped with each other, it is able to judge that a first parameter of the first master MiAN is better than a first parameter of the second master MiAN by judging whether a first numerical range of the first parameter of the first master MiAN is better than a second numerical range of the first parameter of the second master MiAN. If the first numerical range is identical to the same numerical range, it is judged that the first parameter of the first master MiAN is equal to the first parameter of the second master MiAN.

For example, presumed that the bandwidth is divided into a first range of (0-2M], a second range of (2-4] and a third range of (4-6], MiAN3, MiAN 4 and MiAN5 in the above table fall within the third range. At this time, the parameter with the highest priority, i.e., bandwidth, of these MiANs is considered as equal, then the parameters with the next priority, i.e., the type of the network, is taken into consideration. Therefore, the order of these MiANs is as follows: MiAN3, MiAN4 and MiAN5.

In the embodiment, when the slave MiAN tries to perform a communication connection with the master MiAN that has been searched, the method may comprise the following steps. The slave MiAN tries to establish a link layer pairing with the master MiAN through link layer authentication and association. After the pairing is established successfully, the slave MiAN tries to establish a binding relationship on an IP layer with the master MiAN. The link layer pairing may be implemented in the same way as the prior art, which will not be repeated herein. With respect to the binding on an IP layer, a self-organized binding way is provided in embodiments of the present invention, and such a way will be described in detail hereinafter.

After the pairing is established successfully, the slave MiAN further tries to establish a binding relationship on an IP layer with the master MiAN. At this time, the method comprises the following steps:

Step A: the slave MiAN transmits a binding request to the master MiAN on a corresponding channel. A destination IP address of the binding request is the IP address of the master MiAN;

Step B: the slave MiAN judges that the establishment of the communication connection is failed when a binding rejection is received from the master MiAN or information is not received from the master MiAN due to a timeout on the corresponding channel; and Step C: the slave MiAN establishes and stores locally the binding relationship with the master MiAN upon receiving a binding response with respect to the binding request from the master MiAN on the corresponding channel, and transmits a binding confirmation to the master MiAN, so that the master MiAN confirms that the binding is successfully established, and then establishes and stores locally the binding relationship with the slave MiAN.

In the embodiment, the binding request may carry a first parameter including a bandwidth of the slave MiAN, a queue length of the data to be transmitted, a load and power information, so that the master MiAN mobilizes the slave MiAN based on the state information.

The binding rejection in the embodiment may carry reasons for rejection so as to indicate to the slave MiAN the reasons for which the binding is failed.

The binding response may carry a second parameter including a bandwidth of a master MiAN, a queue length of the data to be transmitted, a load and power information so that the slave MiAN acquires the working state of the master MiAN, and further makes a decision for flow control based on the working state.

In order to maintain the binding relationship between the slave MiAN and the master MiAN, a processing mode like "heartbeat package" is provided in the embodiment to keep the link alive. At this time, the master MiAN transmits a connection indication to the slave MiAN. The slave MiAN returns a connection confirmation to the master MiAN after receiving the connection indication. The master MiAN continues to maintain the binding relationship with the slave MiAN after receiving the connection confirmation. Here, if the master MiAN still fails to receive the connection confirmation within a predetermined period of time after transmitting the connection indication, it will cancel the binding relationship and remove the link connection.

The present invention further provides a self-organized unbinding way. After the binding relationship is established between the slave MiAN and the master MiAN, one of the slave MiAN and the master MiAN may transmit an unbinding request to the other one. The unbinding request may carry the reasons for unbinding. The other one of the MiANs transmits an unbinding response to the one of the MiANs after the binding relationship is canceled locally. The one of the MiANs locally cancels the binding relationship upon receiving the unbinding response.

During the binding and unbinding processes, the information includes a certain Information Element (IE) for transmitting the relevant parameters of the cluster system. The IE includes a bandwidth at a WAN side, a queue length, time delay, system load, power information, data transmission flow, data transmission duration, overload indication, privacy indication and other indications. The binding on an IP layer in the embodiment is initiated after the link layer finding and the successful establishment of the link. The information/signaling is effected on the basis of an IP package, and the statistical parameters desired for the IE, such as time delay and queue length, may be obtained from the master MiAN or the slave MiAN periodically.

The above binding is particularly designed according to the features of the cluster system and the MiANs. Prior to the establishment of connection, the operational parameters of the partners to be paired have been obtained. As a result, it is convenient to select and handle the partners to be paired, the possibility of pairing failure or pairing with unsuitable access points will be reduced, and thereby the time delay and power consumption during the whole process will be further decreased.

Figure 8:
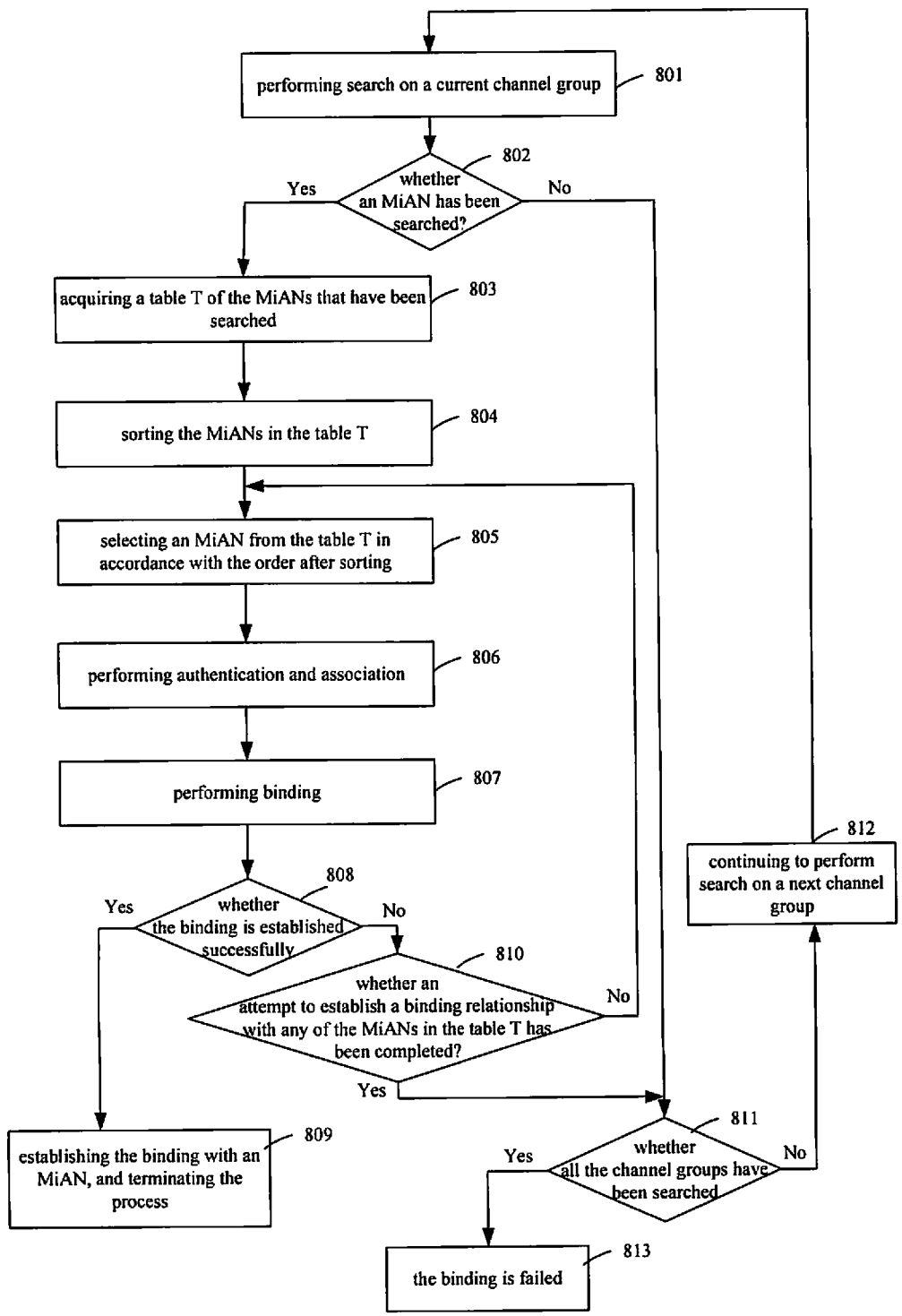
FIG. 8 is a view showing the implementation of the method for finding partners according to embodiments of the present invention.

FIG. 8 is a flow chart of a method for quickly finding and binding self-organized partners according to embodiments of the present invention, where different channel groups are provided with different search priorities. The method comprises the following steps.

Step 801: a slave MiAN performs search on a current channel group. Since the channel groups have different search priorities, the search is performed first from the channel group with the highest priority. Here, the channels within an identical channel group may be irrelative to the search order.

Step 802: the slave MiAN judges whether an MiAN has been searched on the current channel group. If yes, it goes to step 803, and otherwise, it turns to step 811.

Step 803: the slave MiAN acquires a list T of the MiANs that have been searched on the current channel group, and the table T may include one or more MiANs.

Step 804: the slave MiAN sorts the MiANs in the table T in accordance with the above-mentioned method. The sorting may be performed based on the relevant parameters in the working state information carried in a link layer management frame.

Step 805: the slave MiAN selects an MiAN from the table T in accordance with the order after sorting.

Step 806: the slave MiAN performs link layer authentication and association with respect to the MiAN.

Step 807: the slave MiAN binds to the MiAN on an IP layer.

Step 808: the slave MiAN judges whether the binding to the MiAN is successfully established. If yes, it goes to step 809, and otherwise it turns to step 810.

Step 809: the slave MiAN establishes a binding relationship with the MiAN, and if the binding is successfully established, terminates the process.

Step 810: the slave MiAN judges whether an attempt to establish a binding relationship with any of the MiANs in the table T has been completed. If yes, it goes to step 811, and otherwise it returns to step 805, so as to select a next MiAN in the table T to establish the binding relationship.

Step 811: the slave MiAN judges whether all the channel groups have been searched. If yes, it goes to step 813, and otherwise it turns to step 812.

Step 812: the slave MiAN selects a next channel group in accordance with the search priorities, and then it returns to step 801 so as to perform search on the next channel group.

Step 813: the slave MiAN judges that the slave MiAN fails to bind to the MiAN and terminates the process.

The present invention further provides an MiAN cluster system comprising one or more master MiAN and one or more slave MiANs, each including a proximity interface for establishing a communication connection with the other MiANs. Each MiAN further comprises a wireless WAN interface through which the MiAN can access to any standardized cellular network system such as WCDMA, CDMA, WiMAX, LTE and LTE-A, and a wireless LAN interface based on 802.11 WiFi. The proximity interface may be implemented via various communication technologies, for example, via a short-distance communication technology such as Bluetooth or Zigbee.

In the above system, the master MiAN is configured to perform search on working channels of the proximity interface in accordance with a preset search order, and configure the proximity interface to operate on a channel which has been searched first in accordance with the search order and the channel quality of which meets a predetermined requirement; and the slave MiAN is configured to perform search on working channels of the proximity interface in accordance with the preset search order, and try to establish a communication connection with the proximity interface of a master MiAN when the master MiAN is found.

The search order may be the search priorities set separately for the channels of the proximity interface, wherein different channels are provided with different search priorities. The search order may also be the search priorities set for different channel groups when all the working channels of the proximity interface are divided in advance into at least two channel groups, wherein each channel group includes more than one channels.

The slave MiAN and the master MiAN in the system will be described in detail hereinafter.

Figure 9:
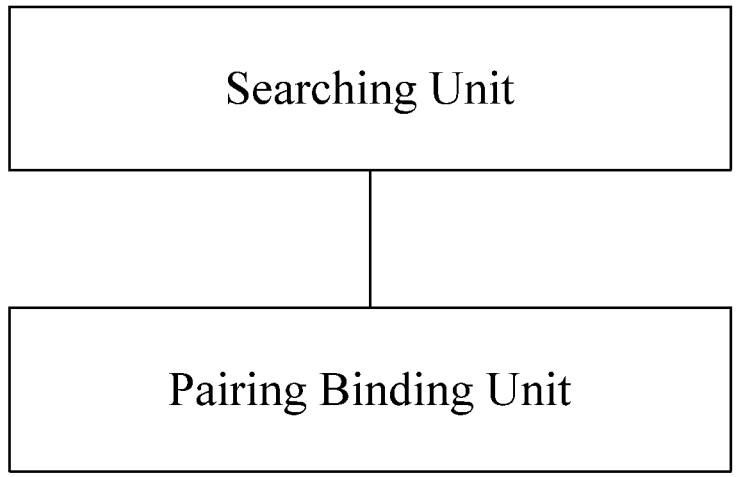
FIG. 9 is a structural schematic view showing a slave MiAN according to embodiments of the present invention.

Referring to FIG. 9, the slave MiAN provided in the embodiment of the present invention comprises:

a searching unit configured to perform search on working channels of the proximity interface in accordance with a preset search order; and a pairing binding unit configured to establish a communication connection with a proximity interface of a master MiAN with respect to the MiANs that have been searched by the searching unit.

When selecting the working channels of the proximity interface, all the master MiANs in the cluster system perform search in accordance with the search order, and operate on the channel which has been searched first in accordance with the search order and the channel quality of which meets a predetermined requirement.

With respect to one scheme for setting the search priorities, the slave MiAN in the embodiment may further comprise:

a first acquiring unit configured to acquire a search priority preset for each channel of the proximity interface, wherein different channels have different search priorities.

At this time, the searching unit is specifically configured to perform search on all the working channels of the proximity interface in a descending order of the search priorities.

The pairing binding unit comprises:

a first processing unit configured to establish a communication connection with the proximity interfaces of the MiANs one by one when the MiANs have been searched by the searching unit on a current channel;

a first controlling unit configured to control the searching unit to stop searching when the communication connection is successfully established between the first processing unit and any of the MiANs, and to control the searching unit to perform search on a next channel when the establishment of the communication connection between the first processing unit and any of the MiANs is failed; and a second processing unit configured to control the searching unit to perform search on the next channel when no MiAN has been searched by the searching unit on the current channel.

With respect to another scheme for setting the search priorities, the slave MiAN in the embodiment may further comprise:

a second acquiring unit configured to acquire at least two channel groups divided in advance for all the working channels of the proximity interface, a search priority of each channel group and channel information included in each channel group, wherein each channel group includes more than one channels, and different channel groups have different search priorities.

At this time, the searching unit is specifically configured to perform search on each of the at least two channel groups in a descending order of the search priorities.

The pairing binding unit may comprise:

a first processing unit configured to establish a communication connection with the proximity interfaces of the MiANs one by one when the MiANs have been searched by the searching unit on a current channel group;

a first control unit configured to control the searching unit to stop searching when the communication connection is successfully established between the first processing unit and any of the MiANs, and to control the searching unit to perform search on a next channel group when the establishment of the communication connection between the first processing unit and any of the MiANs is failed; and a second processing unit configured to control the searching unit to perform search on a next channel group when no MiAN has been searched by the searching unit on the current channel group.

A layer-across indication of the relevant information may also be implemented in embodiments of the present invention. At this time, the searching unit is further configured to filter the MiANs that do not support a clustering function when performing the search in accordance with indication information in a link layer management frame transmitted from the other MiANs for indicating whether the MiANs support a clustering function. The indication information is carried in the working state information included in the link layer management frame when all the MiANs in the cluster system transmit the link layer management frame through the proximity interfaces.

In a preferred embodiment, the working state information further includes at least one of the parameters selected from the group consisting of information indicating whether the MiAN is a private device, a bandwidth of a WAN interface of the MiAN, a current throughput of the WAN interface, a type of network accessed through the WAN interface, the number of work stations that have accessed the MiAN, information indicating whether the work stations that have accessed the MiAN are full, and power information. At this time, the first processing unit may further comprise:

a sorting unit configured to sort the MiANs that have been searched in accordance with the at least one parameter; and a connection trying unit configured to try to establish a communication connection with the proximity interfaces of the MiANs that have been searched one by one in accordance with the order after sorting, until the communication connection is established successfully or an attempt to establish the communication connection with any of the MiANs is failed.

When there are two or more parameters, the sorting unit may comprise:

a first determining unit configured to determine a priority of each of the two or more parameters; and a second determining unit configured to judge superiority of the same parameter of the MiANs that have been searched sequentially in a descending order of the priorities of the parameters, so as to determine an order of the MiANs, and when it is judged that a first parameter of a first MiAN is better than a first parameter of a second MiAN, determine that the first MiAN is prior to the second MiAN.

In a preferred embodiment, the pairing binding unit comprises:

a pairing unit configured to try to establish a pairing on a link layer with an MiAN through link layer authentication and association; and a binding unit configured to try to establish a binding relationship on an IP layer with the MiAN after the pairing is established successfully.

The binding unit comprises:

a requesting unit configured to transmit a binding request to a master MiAN on a corresponding channel, a destination IP address of the binding request being an IP address of the master MiAN;

a failure processing unit configured to judge that the establishment of the communication connection is failed when a binding rejection is received from the master MiAN or information is not received from the master MiAN due to a timeout on the corresponding channel; and a success processing unit configured to establish and store locally the binding relationship with the master MiAN upon receiving a binding response with respect to the binding request from the master MiAN on the corresponding channel, and send a binding confirmation to the master MiAN so that the master MiAN confirms that the binding is successfully established.

The connection between the slave MiAN and the master MiAN can be maintained in a "heartbeat package" manner according to the embodiment of the present invention. At this time, the slave MiAN may comprise:

a connection maintaining unit configured to receive a connection indication from a master MiAN after the binding relationship is established between the slave MiAN and the master MiAN, and return a connection confirmation to the master MiAN so that the master MiAN maintains the binding relationship therebetween.

In order to effect a self-organized unbinding, the slave MiAN in the embodiment may further comprise:

an unbinding requesting unit configured to send an unbinding request to the master MiAN when it needs to unbind the slave MiAN and the master MiAN, the unbinding request carrying the reasons for unbinding; and an unbinding responding unit configured to cancel the binding relationship locally upon receiving an unbinding response returned from the master MiAN, cancel the binding relationship locally upon receiving the unbinding request from the master MiAN, and return the unbinding response to the master MiAN.

Figure 10:
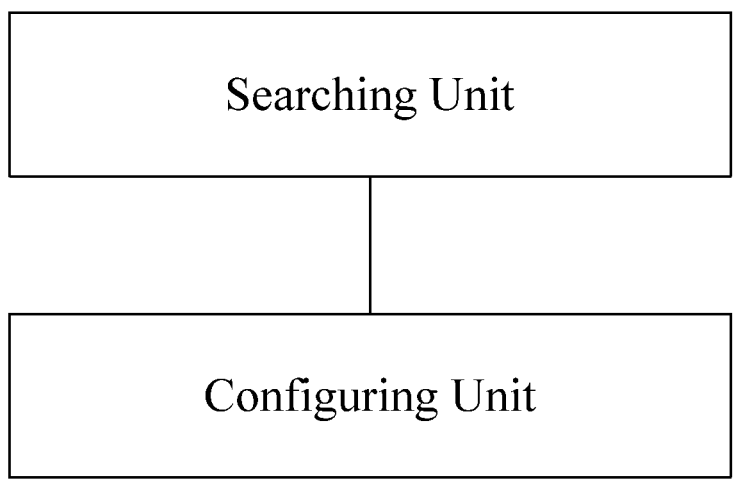
FIG. 10 is a structural schematic view showing a master MiAN according to embodiments of the present invention.

Referring to FIG. 10, a master MiAN provided in one embodiment of the present invention comprises:

a searching unit configured to perform search on working channels of a proximity interface in accordance with a preset search order; and a configuring unit configured to configure the proximity interface of the master MiAN to operate on the channel which has been searched first in accordance with the search order and the channel quality of which meets a predetermined requirement.

Preferably, the master MiAN in the embodiment may select the working channels of the proximity interface based on the preset search priorities for different channels. At this time, the master MiAN may further comprise:

a first acquiring unit configure to acquire a search priority preset for each channel of the proximity interface, different channels having different search priorities.

The searching unit is specifically configured to perform search on all the working channels of the proximity interface one by one in a descending order of the search priorities.

The configuring unit is specifically configured to acquire a search result from the searching unit on a current channel, configure the proximity interface of the master MiAN to operate on the channel when there exists in the search result a channel whose channel quality meets the predetermined requirement, and control the searching unit to stop searching.

Preferably, the master MiAN in the embodiment may select the working channels of the proximity interface based on the preset search priorities for different channel groups. At this time, the master MiAN may further comprise:

a second acquiring unit configured to acquire at least two channel groups divided in advance for all the working channels of the proximity interface, a search priority of each channel group, and channel information included in each channel group, each channel group including more than one channels and different channel groups having different search priorities.

The searching unit is specifically configured to perform search on each of the at least two channel groups in a descending order of the search priorities.

The configuring unit is specially configured to acquire a search result from the searching unit on a current channel group, configure the proximity interface of the master MiAN to operate on the channel when there exists in the search result a channel whose channel quality meets the predetermined requirement, and control the searching unit to stop searching.

In order to achieve layer-across transmission of the working state information, the master MiAN in the embodiment may further comprise:

a transmission processing unit configured to carry working state information of the master MiAN in a link layer management frame from the master MiAN, the working state information including indication information indicating whether the master MiAN supports a clustering function, so as to filter by a slave MiAN in advance the master MiAN that does not support a clustering function in accordance with the indication information when the slave MiAN searches the master MiAN and tries to establish a communication connection with the proximity interface of the master MiAN.

The working state information further includes at least one of the parameters selected from the group consisting of information indicating whether the MiAN is a private device, a bandwidth of a WAN interface of the MiAN, a current throughput of the WAN interface, a type of network accessed through the WAN interface, the number of work stations that have accessed the MiAN, information indicating whether the work stations that have accessed the MiAN are full, and power information, so that the slave MiAN sorts the master MiANs that have been searched in accordance with the at least one parameter when the slave MiAN searches the master MiAN and tries to establish a communication connection with the proximity interface of the master MiAN.

Preferably, the master MiAN may further comprise:

a pairing unit configured to establish a pairing on a link layer with a slave MiAN through link layer authentication and association; and a binding unit configured to establish a binding relationship on an IP layer with the slave MiAN after the pairing is established successfully.

Preferably, the binding unit comprises:

a first processing unit configured to transmit a binding rejection or a binding response to the slave MiAN on a corresponding channel upon receiving a binding request from the slave MiAN on the corresponding channel; and a second processing unit configured to locally establish and store the binding relationship with the slave MiAN upon receiving a binding confirmation from the slave MiAN on the corresponding channel.

Preferably, the master MiAN may further comprise:

a connection maintaining unit configured to transmit a connection indication to the slave MiAN after the binding relationship is established between the master MiAN and the slave MiAN, and maintain the binding relationship therebetween after receiving a connection confirmation from the slave MiAN.

Preferably, the master MiAN may further comprise:

an unbinding requesting unit configured to transmit an unbinding request to the slave MiAN when it needs to unbind the slave MiAN and the master MiAN, the unbinding request carrying the reasons for unbinding; and an unbinding responding unit configured to locally cancel the binding relationship upon receiving an unbinding response from the slave MiAN, locally cancel the binding relationship upon receiving the unbinding request from the slave MiAN, and return the unbinding response to the slave MiAN.

The functional members described in the specification are referred to as modules, so as to emphasize the independence of the implementation in a more particular manner.

According to the embodiments of the present invention, the modules may be implemented by software, so as to be executed by various processors. For example, an identified, executable code module may comprise one or more physical or logical blocks including computer instructions, and the module can be constructed as an image, a process or a function. Even so, the executable codes of the identified modules are unnecessary to be physically located together, but may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

The above are merely the embodiments of the present invention. It should be noted that, a person skilled in the art may further make improvements and modifications without departing from the principle of the present invention, and these improvements and modifications shall also be considered as the scope of the present invention.

What is claimed is:

1. A method for finding partners in a Mobile Internet Access Node MiAN cluster system, wherein the MiAN cluster system comprising a server, one or more master MiANs and one or more slave MiANs, each of the MiANs including a proximity interface for establishing a communication connection with the other MiANs, the method comprising the steps of:

performing, by the slave MiAN, search on working channels of the proximity interface in accordance with a preset search order, and trying to establish a communication connection with the proximity interface of a master MiAN with respect to the MiANs that have been searched during the search process;

wherein, when selecting the working channels of the proximity interface, all the master MiANs in the clustering system perform search in accordance with the search order, and operate on the channel which has been searched first in accordance with the search order and the channel quality of which meets a predetermined requirement; wherein acquiring at least two channel groups divided in advance for all the working channels of the proximity interface, a search priority of each channel group, and channel information included in each channel group, wherein each channel group including more than one channel, and different channel groups having different search priorities, the number of the channels included in the channel group with a higher search priority is smaller than the number of the channels included in the channel group with a lower search priority;

performing search on each channel group of the at least two channel groups in a descending order of the search priorities;

trying to establish a communication connection with the proximity interfaces of the MiANs one by one when the MiANs have been searched on a current channel group, and terminating the process when the communication connection with any of the MiANs has been established successfully, otherwise continuing to perform search on a next channel group; and continuing to perform search on the next channel group if no MiAN has been searched on the current channel group.

2. The method according to claim 1, wherein all the MiANs further carry working state information in a link layer management frame transmitted through the proximity interfaces, the working state information includes indication information indicating whether the MiAN supports a clustering function, and when performing the search, the slave MiAN further filters the MiAN that does not support a clustering function in accordance with the indication information carried in the link layer management frame and transmitted from the other MiANs.

3. The method according to claim 2, wherein the working state information further includes at least one of the parameters selected from the group consisting of information indicating whether the MiAN is a private device, a bandwidth of a Wide Area Network WAN interface of the MiAN, a current throughput of the WAN interface, a type of the network accessed through the WAN interface, the number of work stations that have accessed the MiAN, information indicating whether the work stations that have accessed the MiAN are full, and power information, the step of trying to establish the communication connection with the proximity interfaces of the MiANs that have been searched one by one comprises:

sorting, by the slave MiAN, the MiANs that have been searched in accordance with the at least one parameter; and trying to establish a communication connection with the MiANs that have been searched one by one in accordance with the order after sorting, until the communication connection has been successfully established or an attempt to establish the communication connection with all the MiANs is failed.

4. The method according to claim 3, wherein when there are two or more parameters, the step of sorting the MiANs that have been searched comprises:
determining a first priority of each of the two or more parameters; and
judging a second priority of the same parameter of the MiANs that have been searched sequentially in a descending order of the first priorities of the parameters, so as to determine an order of the MiANs, and when a second priority of a first parameter of a first MiAN is higher than a second priority of a first parameter of a second MiAN, determining that the order of the first MiAN is prior to the order of the second MiAN.

5. The method according to claim 1, wherein the step of trying to establish the communication connection with the proximity interface of the master MiAN comprises:
trying, by the slave MiAN, to establish a link layer pairing with the master MiAN through link layer authentication and association; and
trying, by the slave MiAN, to establish a binding relationship with the master MiAN on an Internet Protocol IP layer after the pairing is established successfully.

6. The method according to claim 5, wherein the step of trying, by the slave MiAN, to establish the binding relationship with the master MiAN on the IP layer comprises:
transmitting, by the slave MiAN, a binding request to the master MiAN on a corresponding channel, a destination IP address of the binding request being an IP address of the master MiAN;
judging, by the slave MiAN, that the establishment of the communication connection is failed when a binding rejection is received from the master MiAN or information is not received from the master MiAN due to a timeout on the corresponding channel; and
establishing and storing locally, by the slave MiAN, the binding relationship with the master MiAN upon receiving a binding response with respect to the binding request from the master MiAN on the corresponding channel, and sending a binding confirmation to the master MiAN so that the master MiAN confirms that the binding is successfully established.

7. The method according to claim 6, wherein the binding request carries a first parameter including a bandwidth of the slave MiAN, a queue length of the data to be transmitted, a load and power information, so that the master MiAN mobilizes the slave MiAN based on the first parameter,
the binding rejection carries reasons for rejection so as to indicate to the slave MiAN the reasons for which the binding is failed, and
the binding response carries a second parameter including a bandwidth of the master MiAN, a queue length of the data to be transmitted, a load and power information so that the slave MiAN acquires the working state of the master MiAN.

8. The method according to claim 5, wherein after the binding relationship between the slave MiAN and the master MiAN is established, the method further comprises:
transmitting, by the master MiAN, a connection indication to the slave MiAN; and
returning, by the slave MiAN, a connection confirmation to the master MiAN upon receiving the connection indication, so that the master MiAN maintains the binding relationship with the slave MiAN.

9. The method according to claim 5, wherein when it is desired to unbind the slave MiAN and the master MiAN, the method further comprises:
transmitting, by one of the slave MiAN and the master MiAN, an unbinding request to the other one, the unbinding request carrying the reasons for unbinding;
transmitting an unbinding response to the one of the slave MiAN and the master MiAN after the binding relationship is canceled locally by the other one; and
locally cancelling, by the one of the slave MiAN and the master MiAN, the binding relationship upon receiving the unbinding response.

10. A slave Mobile Internet Access Node MiAN in a MiAN cluster system, comprising:
a searching processing circuit that performs a search on working channels of a proximity interface in accordance with a preset search order; and
a pairing binding processing circuit that establishes a communication connection with a proximity interface of a master MiAN with respect to the MiANs that have been searched by the searching processing circuit,
wherein when selecting the working channels of the proximity interface, all the master MiANs in the cluster system perform search in accordance with the search order, and operate on the channel which has been searched first in accordance with the search order and the channel quality of which meets a predetermined requirement;
the slave MiAN further comprises:
a second acquiring processing circuit that acquires at least two channel groups divided in advance for all working channels of the proximity interface, a search priority of each channel group and channel information included in each channel group, wherein each channel group including more than one channels, and different channel groups having different search priorities, the number of the channels included in the channel group with a higher search priority is smaller than the number of the channels included in the channel group with a lower search priority;
wherein the searching processing circuit is specifically configured to perform search on each of the at least two channel groups in a descending order of the search priorities, and
the pairing binding processing circuit comprises:
a first processing circuit that establishes a communication connection with the proximity interfaces of the MiANs one by one when the MiANs have been searched by the searching processing circuit on a current channel group;
a first control processing circuit that controls the searching processing circuit to stop searching when the communication connection is successfully established between the first processing circuit and any of the MiANs, and to control the searching processing circuit to perform search on a next channel group when the establishment of the communication connection between the first processing unit and any of the MiANs is failed; and
a second processing circuit that controls the searching processing circuit to perform search on the next channel group when no MiAN has been searched by the searching processing circuit on the current channel group.

11. The slave MiAN according to claim 10, wherein the searching processing circuit, when performing the search, is further configured to filter the MiANs that do not support a clustering function in accordance with indication information in a link layer management frame from the other MiANs for indicating whether the MiANs support a clustering function, wherein the indication information is carried in working state information included in the link layer management frame when all the MiANs in the cluster system transmit the link layer management frame through the proximity interfaces.

12. The slave MiAN according to claim 11, wherein the working state information further includes at least one of the parameters selected from the group consisting of information indicating whether the MiAN is a private device, a bandwidth of a Wide Area Network WAN interface of the MiAN, a current throughput of the WAN interface, a type of network accessed through the WAN interface, the number of work stations that have accessed the MiAN, information indicating whether the work stations that have accessed the MiAN are full, and power information, and
the first processing circuit comprises:
a sorting processing circuit that sorts the MiANs that have been searched in accordance with the at least one parameter; and
a connection trying processing circuit that tries to establish a communication connection with the proximity interfaces of the MiANs that have been searched one by one in accordance with the order after sorting, until the communication connection is established successfully or an attempt to establish the communication connection with all the MiANs is failed.

13. The slave MiAN according to claim 12, wherein when there are two or more parameters, the sorting processing circuit comprises:
a first determining processing circuit that determines a first priority of each of the two or more parameters; and
a second determining processing circuit that judges a second priority of the same parameter of the MiANs that have been searched sequentially in a descending order of the first priorities of the parameters, so as to determine an order of the MiAN, and when it is judged that a second priority of a first parameter of a first MiAN is higher than a second priority of a first parameter of a second MiAN, determine that the first MiAN is prior to the second MiAN.

14. The slave MiAN according to claim 10, wherein the pairing binding processing circuit comprises:
a pairing processing circuit that tries to establish a pairing on a link layer with the master MiAN through link layer authentication and association; and
a binding processing circuit that tries to establish a binding relationship on an Internet Protocol IP layer with the master MiAN after the pairing is established successfully.

15. The slave MiAN according to claim 14, wherein the binding processing circuit comprises:
a requesting processing circuit that transmits a binding request to the master MiAN on a corresponding channel, a destination IP address of the binding request being an IP address of the master MiAN;
a failure processing circuit that judges that the establishment of the communication connection is failed when a binding rejection is received from the master MiAN or information is not received from the master MiAN due to a timeout on the corresponding channel; and
a success processing circuit that establishes and stores locally the binding relationship with the master MiAN upon receiving a binding response with respect to the binding request from the master MiAN on the corresponding channel, and transmits a binding confirmation to the master MiAN so that the master MiAN confirms that the binding is successfully established.

16. The slave MiAN according to claim 14, further comprising:
a connection maintaining processing circuit that receives a connection indication from a master MiAN after the binding relationship is established between the slave MiAN and the master MiAN, and return a connection confirmation to the master MiAN so that the master MiAN maintains the binding relationship therebetween.

17. The slave MiAN according to claim 14, further comprising:
an unbinding requesting processing circuit that transmits an unbinding request to the master MiAN when it needs to unbind the slave MiAN and the master MiAN, the unbinding request carrying the reasons for unbinding; and
an unbinding responding processing circuit that locally cancels the binding relationship upon receiving an unbinding response returned from the master MiAN, locally cancels the binding relationship upon receiving the unbinding request from the master MiAN, and returns the unbinding response to the master MiAN.

18. A master Mobile Internet Access Node MiAN in a MiAN cluster system, comprising:
a searching processing circuit that searches on working channels of a proximity interface in accordance with a preset search order; and
a configuring processing circuit that configures the proximity interface of the master MiAN to operate on the channel which has been searched first in accordance with the search order and the channel quality of which meets a predetermined requirement;
the master MiAN further comprises:
a second acquiring processing circuit that acquires at least two channel groups divided in advance for all the working channels of the proximity interface, a search priority of each channel group, and channel information included in each channel group, wherein each channel group including more than one channels and different channel groups having different search priorities, the number of the channels included in the channel group with a higher search priority is smaller than the number of the channels included in the channel group with a lower search priority;
the searching processing circuit is specifically configured to perform search on each of the at least two channel groups in a descending order of the search priorities, and
the configuring processing circuit is specially configured to acquire a search result from the searching processing circuit on a current channel group, configure the proximity interface of the master MiAN to operate on the channel when there exists in the search result a channel whose channel quality meets the predetermined requirement, and control the searching processing circuit to stop searching.

19. The master MiAN according to claim 18, further comprising:
a transmission processing circuit that carries working state information of the master MiAN in a link layer management frame from the master MiAN, the working state information including indication information indicating whether the master MiAN supports a clustering function, so as to filter by a slave MiAN in advance the master MiAN that does not support a clustering function in accordance with the indication information when the slave MiAN searches the master MiAN and tries to establish a communication connection with the proximity interface of the master MiAN.

20. The master MiAN according to claim 19, wherein the working state information further includes at least one of the parameters selected from the group consisting of information indicating whether the MiAN is a private device, a bandwidth of a Wide Area Network WAN interface of the MiAN, a current throughput of the WAN interface, a type of the network accessed through the WAN interface, the number of work stations that have accessed the MiAN, information indicating whether the work stations that have accessed the MiAN are full, and power information, so that the slave MiAN sorts the master MiANs that have been searched in accordance with the at least one parameter when the slave MiAN searches the master MiAN and tries to establish a communication connection with the proximity interface of the master MiAN.

21. The master MiAN according to claim 20, further comprising:
a pairing processing circuit that establishes a pairing on a link layer with the slave MiAN through link layer authentication and association; and
a binding processing circuit that establishes a binding relationship on an Internet Protocol IP layer with the slave MiAN after the pairing is established successfully.

22. The master MiAN according to claim 21, wherein the binding processing circuit comprises:
a first processing circuit that transmits a binding rejection or a binding response to the slave MiAN on a corresponding channel upon receiving a banding request from the slave MiAN on the corresponding channel; and
a second processing circuit that locally establishes and stores the binding relationship with the slave MiAN upon receiving a binding confirmation from the slave MiAN on the corresponding channel.

23. The master MiAN according to claim 21, further comprising:
a connection maintaining processing circuit that transmits a connection indication to the slave MiAN after the binding relationship is established between the master MiAN and the slave MiAN, and maintain the binding relationship therebetween after receiving a connection confirmation from the slave MiAN.

24. The master MiAN according to claim 22, further comprising:
an unbinding requesting processing circuit that transmits an unbinding request to the slave MiAN when it needs to unbind the slave MiAN and the master MiAN, the unbinding request carrying the reasons for unbinding; and
an unbinding responding processing circuit that locally cancels the binding relationship upon receiving an unbinding response from the slave MiAN, locally cancels the binding relationship upon receiving the unbinding request from the slave MiAN, and returns the unbinding response to the slave MiAN.

25. A Mobile Internet Access Node MiAN cluster system, comprising one or more master MiANs according to claim 18 and one or more slave MiANs according to claim 10, each MiAN including a proximity interface for establishing a communication connection with the other MiANs.

* * * * *